United States Patent [19]

Steinbach

[11] Patent Number: 5,912,897

[45] Date of Patent: Jun. 15, 1999

[54] METHOD FOR CONVERTING MESSAGES EXHIBITING DIFFERENT FORMATS IN COMMUNICATION SYSTEMS

[75] Inventor: Holger Steinbach, Paderborn, Germany

[73] Assignee: Siemens Aktiengesellschaft, Munich, Germany

[21] Appl. No.: 08/791,462

[22] Filed: Jan. 27, 1997

[30] Foreign Application Priority Data

Jan. 31, 1996 [DE] Germany ................ 196 03 474

[51] Int. Cl.⁶ .................................................. H04J 3/16
[52] U.S. Cl. ............................................ 370/467; 379/229
[58] Field of Search ......................................... 370/401, 402, 370/465, 466, 467, 522; 379/229, 230

[56] References Cited

U.S. PATENT DOCUMENTS

| 5,500,852 | 3/1996 | Riley | 370/16 |
|---|---|---|---|
| 5,574,439 | 11/1996 | Miyashita | 340/825.44 |
| 5,594,721 | 1/1997 | Pan | 370/392 |
| 5,644,571 | 7/1997 | Seaman | 370/401 |

*Primary Examiner*—Chi H. Pham
*Assistant Examiner*—Kim T. Nguyen
*Attorney, Agent, or Firm*—Hill & Simpson

[57] ABSTRACT

In a method for converting messages exhibiting different formats in communication systems, using at least one configuration table, determining conversion tables that are individual to message type are converted according to conversion specifications of these conversion tables, insofar as allocated communication system-specific information of communication systems taking place in the respective message exchange are different. In this way, a conversion or compatibility of the greatest variation in formats of messages is achieved with the lowest programming expense.

7 Claims, 2 Drawing Sheets

CONVERSION TABLE

METHOD FOR CONVERTING MESSAGES EXHIBITING DIFFERENT FORMATS IN COMMUNICATION SYSTEMS

BACKGROUND OF THE INVENTION

In public or private communication networks, communication systems communicate using standardized signaling procedures (e.g. signaling procedure no. 7) or specific signaling procedures for private communication networks (e.g. Cornet, of the firm Siemens). In private communication networks in particular, the signaling and message information to be exchanged are transmitted via fixed connections (e.g. a signaling procedure no. 7 fixed connection), whereby messages are inserted into the signaling information, by means of which messages the communication systems are controlled with regard to switching. For takeover and preparation of messages, at least one internal message interface is provided in the communication systems, whereby the formats of the messages or message elements transmitted via the internal message interface can deviate dependent on the release, i.e. on the degree of updating of the respective communication system. The information contents of the messages remain equal, however. These different formats result in the communication system in particular given extensive expansions for controlling additional performance features, whereby the program-oriented changes arc displayed in the communication system by means of an updating information or a release information.

SUMMARY OF THE INVENTION

An object of the invention is to provide a method such that messages with different formats, embedded in signaling information, can be exchanged between communication systems.

According to the method of the invention for converting messages exhibiting different formats in communication systems, the messages being transmitted between communication systems, communication system-specific information are stored in at least one configuration table. Conversion specifications are indicated in conversion tables that are individual to message type. In the communication systems, the communication system-specific information of the communication systems taking part in the respective message exchanges are determined upon reception or transmission of a message. Given different communication system-specific information, the conversion table is determined dependent on the type of message with the communication-specific information stored in the configuration tables. The message is then converted according to the conversion specification of the conversion table.

An important aspect of the inventive method is that information specific to the communication system are stored in at least one configuration table, and conversion specifications are indicated in conversion tables, the tables being individualized for each message type.

In the communication systems, upon reception or transmission of a message, the communication system-specific information of the communication system taking part in the respective message exchange is determined, and, given different communication system-specific information, a conversion table is determined with the communication system-specific information stored in the configuration tables, dependent on the type of message, and the message is converted according to the conversion specifications of this conversion table. Using the configuration and conversion tables of the invention, a conversion or compatibility of the greatest variations formats of messages, and the greatest variation in internal message interfaces, is achieved with the lowest programming expense.

The information specific to the communication system is advantageously represented by means of a release information indicating the updating of the respective communication system. This release information shows the current program-oriented and functional state of a communication system in a communication network, and thus also shows into what format messages from the internal message interface, in particular signaling messages, must be converted for a transmission via a signaling channel between communication systems.

The conversion tables are determined particularly advantageously using a first and a second configuration table. In a release table representing a first configuration table, a first table information is respectively allocated to a release information indicating the degree of updating of the communication systems, the table information respectively indicating a message table representing a second configuration table. In the message tables, a second table information is respectively allocated to a type information indicating the message type, the table information indicating a conversion table. By means of this tabular design, a high flexibility is achieved with respect to the conversion of messages of the greatest variation in types, and having different formats.

In the conversion tables, the size and the type of message elements, which are to be removed from a message to be converted or are to be inserted, are respectively indicated. For this insertion and removal of message elements, the relevant positions in the messages are indicated by means of corresponding offset information. For a removal or insertion of one or several message elements from or into the message at the relevant message element position, a separate processing task is respectively provided in the conversion tables, to which task the corresponding processing information, offset information, correction information, functional information and parameter information are allocated.

The sequence of the processing entries advantageously corresponds to the sequence of the message element positions to be processed. This means that the processing entries are entered into the respective conversion tables corresponding to the increasing sequence of the message element positions to be corrected (insertion or removal). This processing entry sequence ensures that the individual message element positions are correctly addressed by means of the information indicated in the respective processing entry. Based on this processing entry sequence, in principle the conversion tables are processed upon transmission in one table direction and upon reception of messages in the opposite table direction.

According to a further advantageous construction of the inventive method, the conversion tables are structured in such a way that, upon transmission of a message to be converted, the respective conversion table is processed in one table direction, and, upon reception of a message to be converted, is processed in the opposite table direction, whereby during the processing in the opposite table direction the processing information is used inversely. Given an insertion information, the processing information is converted into a remove information, and vice versa. By means of this conversion table design and the conversion of the processing information, the programming expense for an implementation of a conversion of messages with different formats can be additionally reduced, since a conversion table is respectively used both upon transmission and upon reception of messages to be converted.

Given complex conversion requirements, different conversion tables are advantageously provided for the conversion of a message to be transmitted or to be received, whereby the conversion tables are processed in opposed table directions. The processing information are hereby used as indicated.

In the following, the method of the invention is explained in more detail on the basis of three graphic representations.

DESCRIPTION OF THE PREFERRED EMBODIMENTS

Figure 1:
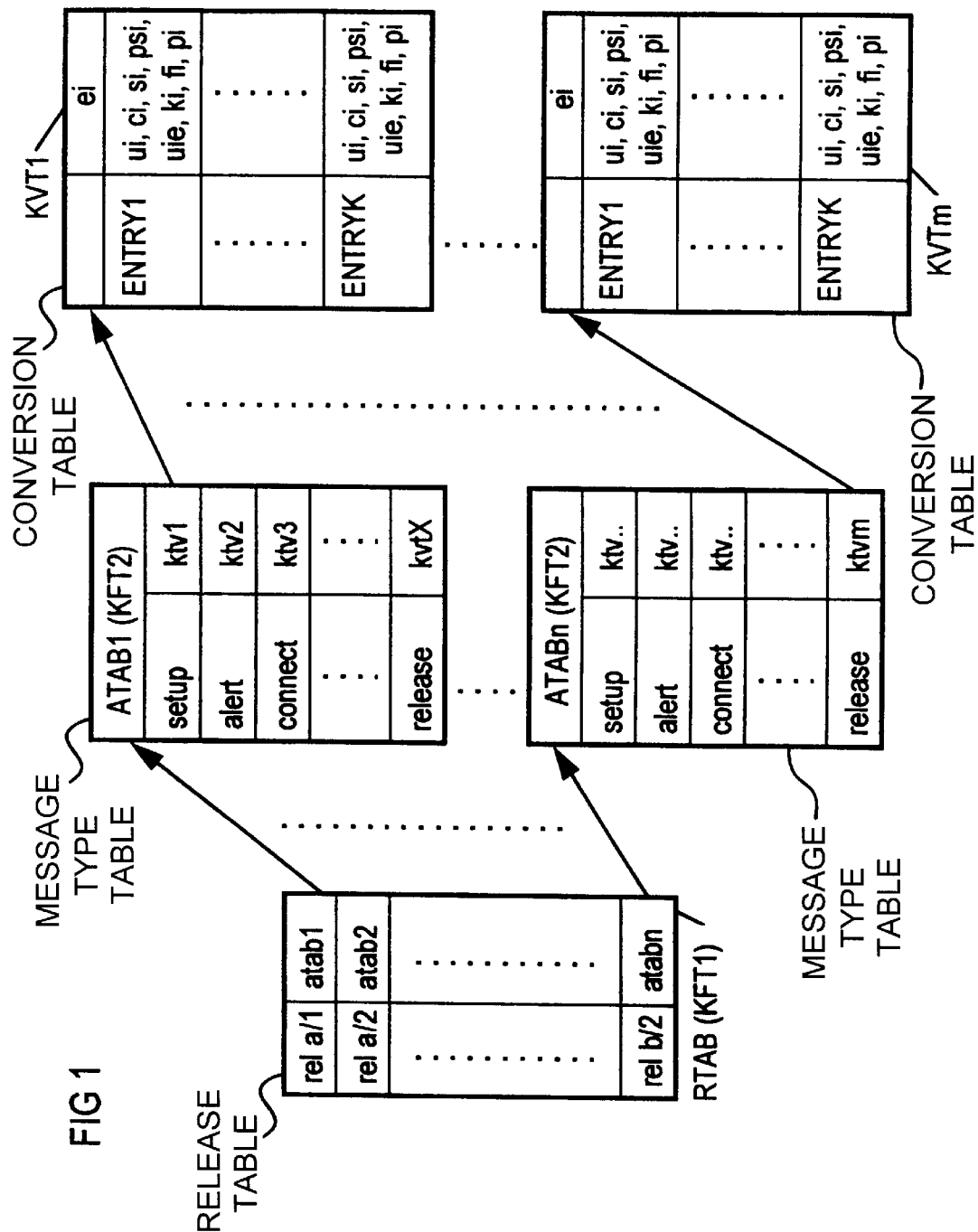
FIG. 1 shows the table structure of the invention.

FIG. 1 shows a table structure on which the method of the invention is based, stored in a communication system (not shown) for a conversion of messages. In a release table RTAB representing a first configuration table KFT1, a release information ret a/1.. b/2 is stored for every degree of updating of a communication system provided in a communication network, e.g. in a private communication network. By means of this release information rel a/1.. b/2, it is also indicated which internal message interface is realized with respect to the formats of the messages in the respective communication system, i.e. in which format the messages are formed and received in a signaling channel. Among those skilled in the art, the degree of updating of a communication system is designated by the release of a communication system, whereby in particular the current program-oriented version of a communication system (in particular with respect to the internal message interface in relation to the exemplary embodiment) is indicated by the release.

A first table information atab1..n is respectively allocated to a release information rel a/1.. b/2. These first table information atab1..n point (indicated by an arrow) to a message type table ATAB1..n, representing a second configuration table KFT2. In the message type tables ATAB1..n, type information setup.. are respectively entered that indicate the occurring types of message N (see FIG. 3) for the respective release. In signaling information used in the context of a signaling between communication systems, e.g. types of messages such as connection setup messages (setup), call messages (alert), through-connect messages (connect) and cleardown messages (release) are provided. One second table information kvt1...m is allocated to a respective type information setup... indicating the type of a message. This second table information kvt1...m respectively shows (indicated by arrows) a conversion table KVT1...m.

1 to k entries ENTRY1..K are indicated in each of the conversion tables KVT1..m, and in each head of a conversion table KVT1...m an entry information ei indicating that the number of entries is entered. The entries ENTRY1..K concern processing entries, i.e. for each processing step (e.g., the insertion of an additional message element n; see FIG. 3) an ENTRY1..K is provided.

A set information ui, indicating the size of a processing entry ENTRY1..K, is allocated to each of the entries ENTRY1..K. The size of a processing entry ENTRY1..K is for example indicated in the number of bytes. In addition, a processing information ci, si is allocated to each processing entry ENTRY1..K. By means of this processing information ci, si it is indicated whether message elements n are removed from the message n (ci) or message elements are inserted into the message N (si). An offset information psi, likewise allocated to each processing entry ENTRY1..K, indicates the message element position at which the message elements n are inserted or removed. The size of message elements n to be inserted or removed is represented by an element size information uie. The size of message elements n to be inserted or to be removed is indicated by the number of bytes to be inserted or to be removed. Using an additional correction information ki respectively allocated to a processing entry ENTRY1..K, a correction position is indicated after a complete processing of a message. A function information fi and a parameter information pi are likewise allocated to each processing entry ENTRY1..K. The function information fi represents an initialization function for the message elements n to be inserted at the message element position. The parameters p1.. for the initialization function are contained in the parameter information pi, whereby the number of parameters p1.. is variable.

For the communication exchange between communication systems, a release information rel a/1.. b/2, indicating the degree of updating of the respective communication system is inserted into each signaling information containing messages N (not shown). If a message is formed in a communication system for a transmission to a further communication system, or if messages N are received from a further communication system in the context of a signaling information transmission, it is checked whether a conversion of the messages N is required. The check occurs on the basis of the release information rel a/1.. b/2, stored in each communication system of a communication network. Since the respective communication system knows its own degree of updating or release, it is checked whether the communication system from which a message is received or the communication system to which a message is to be sent comprises the same degree of updating or release. The release or the corresponding release information rel a/1.. b/2 is determined from a table (not shown) in which a release information ret a/1.. b/2 representing the current degree of updating or release is allocated to each communication system occurring in a communication network. This table is updated after each updating of a communication system, by means of administrative steps (not shown).

If a release information rel a/1.. b/2 different from its own is determined, then the allocated first table information atab1..n is determined using this release information rel a/1.. b/2 in the release table RTAB, by means of which first table information a message type table ATAB1..n is determined for further calculation. In this message table, a second table information kvt1..m is allocated according to message type, i.e. according to message type information setup..., by means of which second table information the conversion table KVT1...m to be used is indicated. Given a message N currently to be converted, it is checked, by determining the message type information setup.. contained in the message N, which message type is involved, and, dependent on the determined message type or message type information SETUP.., the allocated conversion table KVT1..m is determined. The conversion table KVT1...m, determined for the conversion, is processed in one table direction for the conversion of a message N upon transmission, and is processed in the opposite table direction for conversion of a message N upon reception, i.e. the messages are converted with a single conversion table KVT1..m, corresponding to the indicated conversion specifications.

Figure 2:
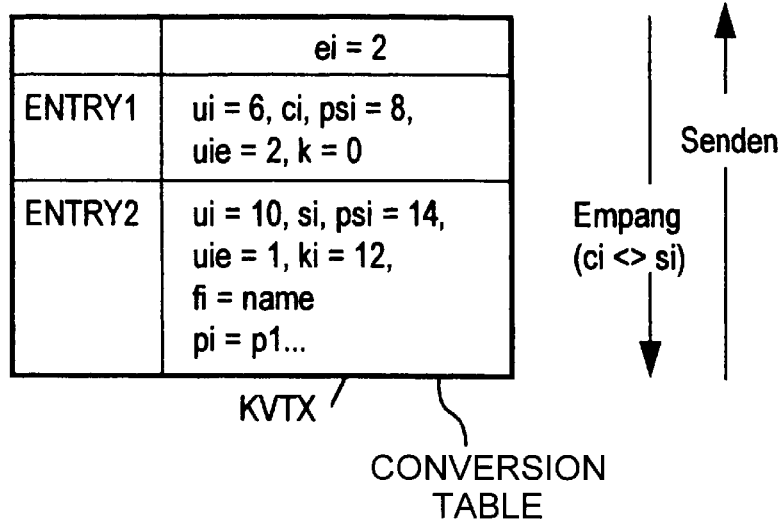
FIG. 2 shows an example of a conversion table.

FIG. 2 shows for example a conversion table KVTX comprising two processing tasks ENTRY1,2, and consequently an entry information ei=2. The size of the first entry ENTRY1 comprises for example six bytes, i.e. ui=6, and the second processing entry ENTRY2 comprises for example ten bytes, i.e. ui=10. For the first entry ENTRY1, two message elements n (i.e. uie=2) should be removed from the message element position 8 (i.e. the offset information psi=8). This means that an information ci indicating the processing is inserted. A correction does not take place, i.e. ki=0. The correction information ki indicates to what extent the size of a message element n is to be corrected with the associated processing entry or processing task. If k>0, the indicated message position (8) is raised or lowered by the value indicated by the size information uie. The second processing entry ENTRY2 additionally contains, alongside the information ui explained above, a processing information si indicating the insertion of elements n, and an offset information psi=14, which indicates the message element position 14 at which a message element X is to be inserted. By means of the element size information uie=1, it is indicated that a message element X is to be inserted. The correction information ki=12 indicates that, after a conversion of the message, the message element n with the information 07, which message element is located at the twelfth message position and indicates a partial message length, is to be corrected by the size uie of the inserted message element X. The subsequent function information fi and parameter information pi are used for the initialization of the insertion process and of the parameters p1.. to be inserted. For example, the conversion table KVTX, shown in FIG. 2, is processed from top to bottom upon reception of a message to be converted, and is processed from bottom to top upon transmission of a message to be converted. The processing information si, ci are used inversely, i.e. a processing information si, ci used in a table direction, e.g. removal of a message element n, is inverted, i.e. is used as an insertion of a message element n.

Figure 3:
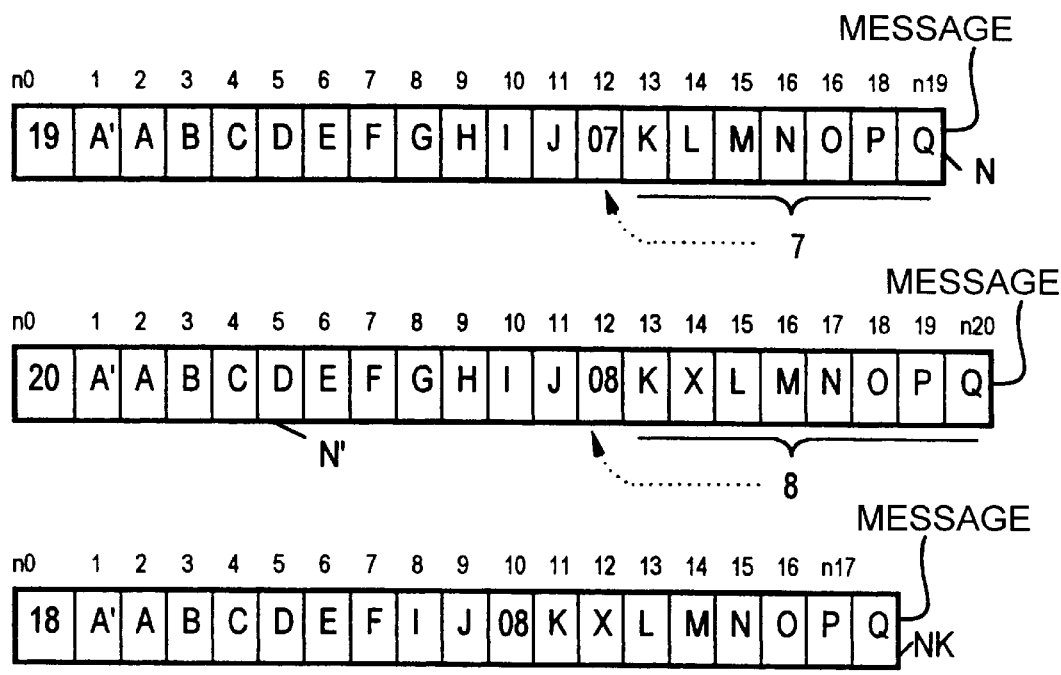
FIG. 3 illustrates a message, as well as messages converted by means of the exemplary conversion table.

FIG. 3 shows a message N to be converted, which is to be converted into a message NK through processing of the exemplary conversion table KVTX according to FIG. 2 upon transmission. The message N to be converted comprises for example 19 message elements n1 . . . 19, in which are entered information A' to J, 07 and K to Q, beginning from the first message element n1. A prefixed message element n0 contains information about the message length; in the exemplary embodiment this is the number 19, based on 19 message elements n1 . . . 19. The twelfth message element n12 contains the value 07, which indicates the number (seven in the exemplary embodiment) of the message elements n13 to n19 of a message N following this message element n12.

As already explained, the exemplary conversion table KVTX is processed from bottom to top, i.e. the second processing entry ENTRY2 is processed first. A message element X is inserted at the message element position 14, by which the message N' is expanded by a message element n15 with the information X. This partially converted message N' is designated N' in FIG. 2, whereby the number 20, indicating the number of message elements n1 . . . 20, is now inserted into the first message element n0, and the information or the value of the message element n12, located at correction position ki=12 is increased by the indicated size (uie=1), from 07 to the value 08. By means of the first processing task ENTRY1 to be processed subsequently, the two (uie=2) message elements n8,9 with the information G,H, following the message element position 8, are removed, whereby the message NK is reduced to 18 message elements n1 . . . 18. The number 18 is entered into the prefixed message element n0 as the information indicating the message length. The message NK, now completely converted, is likewise shown in FIG. 3.

For a conversion upon reception of a message NK, the exemplary conversion table KVTX is processed from top to bottom, whereby a conversion then takes place from the converted message NK via the partially converted message N' to the message N. The indicated processing information si,ci are used inversely, as already explained.

Although various minor changes and modifications might be proposed by those skilled in the art, it will be understood that my wish is to include within the claims of the patent warranted hereon all such changes and modifications as reasonably come within my contribution to the art.

I claim as my invention:

1. A method for converting messages exhibiting different formats in communication systems, the messages being transmitted between communication systems, comprising the steps of:

storing communication system-specific information comprising release information indicating a degree of updating of the respective communication system in at least one configuration table;

indicating conversion specifications in conversion tables that are individual to message type; and in the communication systems, determining the communication system-specific release information of the communication systems taking part in the respective message exchange upon reception or transmission of a message, and, given different communication system-specific information, determining a conversion table dependent on the type of message with the communication system-specific information stored in the configuration tables, and converting the message according to the conversion specifications of the conversion table.

2. The method according to claim 1 wherein in a release table representing a first configuration table, a first table information which indicates a message type table that represents a second configuration table is respectively allocated to a release information that indicates a degree of updating of the respective communication systems;

in the message type tables respectively allocating a second table information which indicates a conversion table to a type information that indicates the message type;

upon reception of messages, acquiring the inserted release information and type information, and, upon transmission of messages, determining the release information and type information of the communication system to which the message is transmitted and comparing the information with the information of the respective communication system;

given different release information, determining the message table with the determined release information in the release table; and determining the conversion table with the type information in the message type table.

3. A method for converting messages exhibiting different formats in communication systems, the messages being transmitted between communication systems, comprising the steps of:

storing communication system-specific information in at least one configuration table;

indicating conversion specifications in conversion tables that are individual to message type;

in the conversion tables indicating an entry information indicating a number of processing entries, and in each sequence of the processing entry there is entered:
- a set information indicating a size of the processing entry;
- a processing information that effects an insertion of an additional message element of a message or a removal of a message element of a message;
- an offset information indicating message element position to be processed in the message;
- an element size information indicating a size of message elements to be inserted or removed;
- a correction information for correcting the message element position;
- a function information for initializing an insertion function at the message element position;
- parameter information to be inserted using the insertion function; and in the communication systems, determining the communication system-specific information of the communication systems taking part in the respective message exchange upon reception or transmission of a message, and, given different communication system-specific information, determining a conversion table dependent on the type of message with the communication system-specific information stored in the configuration tables, and converting the message according to the conversion specifications of the conversion table.

4. The method according to claim 3, wherein the processing entry sequence corresponds to a sequence of the message element positions to be processed.

5. The method according to claim 1 wherein the conversion tables are structured such that the respective conversion table is processed in one table direction upon transmission of a message to be converted, and is processed in an opposite table direction upon reception of a message to be converted, the processing information being converted during the processing in the opposite table direction.

6. The method according to claim 1 wherein different conversion tables are provided for the conversion of a message to be transmitted or to be received, the conversion tables being processed in opposed table directions.

7. A method for converting messages exhibiting different formats in communication systems, comprising the steps of:
- storing communication system-specific information comprising release information indicating a degree of updating of the respective communication system in at least one configuration table;
- using said at least one configuration table, determining conversion tables that are individual to message type; and
- converting messages according to conversion specifications of said conversion tables when allocated communication system-specific release information of communication systems taking place in a respective message exchange are different.

* * * * *